US012711236B2

(12) United States Patent
Pace et al.

(10) Patent No.: US 12,711,236 B2
(45) Date of Patent: Aug. 18, 2026

(54) FIRMWARE VERIFICATION USING PARITY INFORMATION

(71) Applicant: Micron Technology, Inc., Boise, ID (US)

(72) Inventors: Flavio Pace, Filiano (IT); Antonino Pollio, Vico Equense (IT); Laura Ferrante, San Giorgio a Cremano (IT)

(73) Assignee: MICRON TECHNOLOGY, INC., Boise, ID (US)

(*) Notice: Subject to any disclaimer, the term of this patent is extended or adjusted under 35 U.S.C. 154(b) by 169 days.

(21) Appl. No.: 18/669,487

(22) Filed: May 20, 2024

(65) Prior Publication Data

US 2024/0394371 A1 Nov. 28, 2024

Related U.S. Application Data

(60) Provisional application No. 63/503,651, filed on May 22, 2023.

(51) Int. Cl.
*G06F 21/57* (2013.01)
*H04L 9/32* (2006.01)

(52) U.S. Cl.
CPC .......... *G06F 21/572* (2013.01); *H04L 9/3236* (2013.01)

(58) Field of Classification Search
CPC ............................. G06F 21/572; H04L 9/3236
See application file for complete search history.

(56) References Cited

U.S. PATENT DOCUMENTS

2011/0004807 A1* 1/2011 Smith ..................... G06F 21/64 714/766
2014/0095886 A1* 4/2014 Futral ..................... G06F 21/57 713/187
2020/0210586 A1* 7/2020 Cariello ................. G11C 16/26
2021/0141703 A1* 5/2021 Prabhu ................ G06F 11/2094
2023/0161881 A1* 5/2023 Perez .................... G06F 21/572 713/2
2023/0401054 A1* 12/2023 Ansari .................. G06F 21/572
2024/0126887 A1* 4/2024 Lim ...................... G06F 21/575
2025/0103206 A1* 3/2025 Binfet ................... G06F 3/0622
2025/0119229 A1* 4/2025 Pace ..................... G06F 21/572
2025/0148133 A1* 5/2025 Caraccio ............. G11C 11/2275
2025/0184157 A1* 6/2025 Dover ................... G06F 21/575
2025/0219846 A1* 7/2025 Dover ................... H04L 9/0866
2025/0238321 A1* 7/2025 Palmer ................ G06F 11/1068
2025/0265204 A1* 8/2025 Kirkpatrick ........... G06F 3/0613
2025/0291739 A1* 9/2025 Radovanovic ...... G06F 12/1408
2025/0315531 A1* 10/2025 Orlando .................. G06F 8/654
2025/0328648 A1* 10/2025 Jiang ...................... G06F 21/64
2025/0328649 A1* 10/2025 Orlando ................ G06F 21/575
2025/0335111 A1* 10/2025 Shan ..................... G06F 3/0673
2025/0377831 A1* 12/2025 Mesnier ................ G06F 3/0605

* cited by examiner

*Primary Examiner* — Stephen T Gundry
(74) *Attorney, Agent, or Firm* — NICHOLSON DE VOS WEBSTER & ELLIOTT LLP

(57) ABSTRACT

Methods, systems, and apparatuses include reading a firmware image from a memory device. Parity data for the firmware image is computed. A first authentication code associated with the firmware image is received. A second authentication code is computed by performing a cryptographic operation on the parity data. It is determined that the first authentication code and the second authentication code match. The firmware image is loaded onto the memory device in response to determining that the first authentication code and the second authentication code match.

20 Claims, 5 Drawing Sheets

400
READ FIRMWARE IMAGE
405
AGGREGATE PARITY DATA FOR FIRMWARE IMAGE
410
RECEIVE FIRST AUTHENTICATION CODE
415
COMPUTE SECOND AUTHENTICATION CODE BY PERFORMING CRYPTOGRAPHIC OPERATION ON PARITY DATA
420
DETERMINE WHETHER FIRST AUTHENTICATION CODE AND SECOND AUTHENTICATION CODE MATCH
425
INSTALL FIRMWARE IMAGE ONTO THE MEMORY DEVICE IN RESPONSE TO THE CODES MATCHING
430

500
PROCESSING DEVICE
502
INSTRUCTIONS
526
FIRMWARE VERIFICATION COMPONENT
113
STATIC MEMORY
506
BUS 530
MAIN MEMORY
504
INSTRUCTIONS
526
FIRMWARE VERIFICATION COMPONENT
113
DATA STORAGE SYSTEM
518
MACHINE-READABLE MEDIUM
524
INSTRUCTIONS
526
FIRMWARE VERIFICATION COMPONENT
113
NETWORK INTERFACE DEVICE
508
NETWORK
520

FIRMWARE VERIFICATION USING PARITY INFORMATION

CROSS-REFERENCE TO RELATED APPLICATION

The present application claims the benefit of U.S. Provisional Patent Application No. 63/503,651 filed on May 22, 2023, which is incorporated by reference herein in its entirety.

TECHNICAL FIELD

The present disclosure generally relates to firmware verification, and more specifically, relates to firmware verification using parity information.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
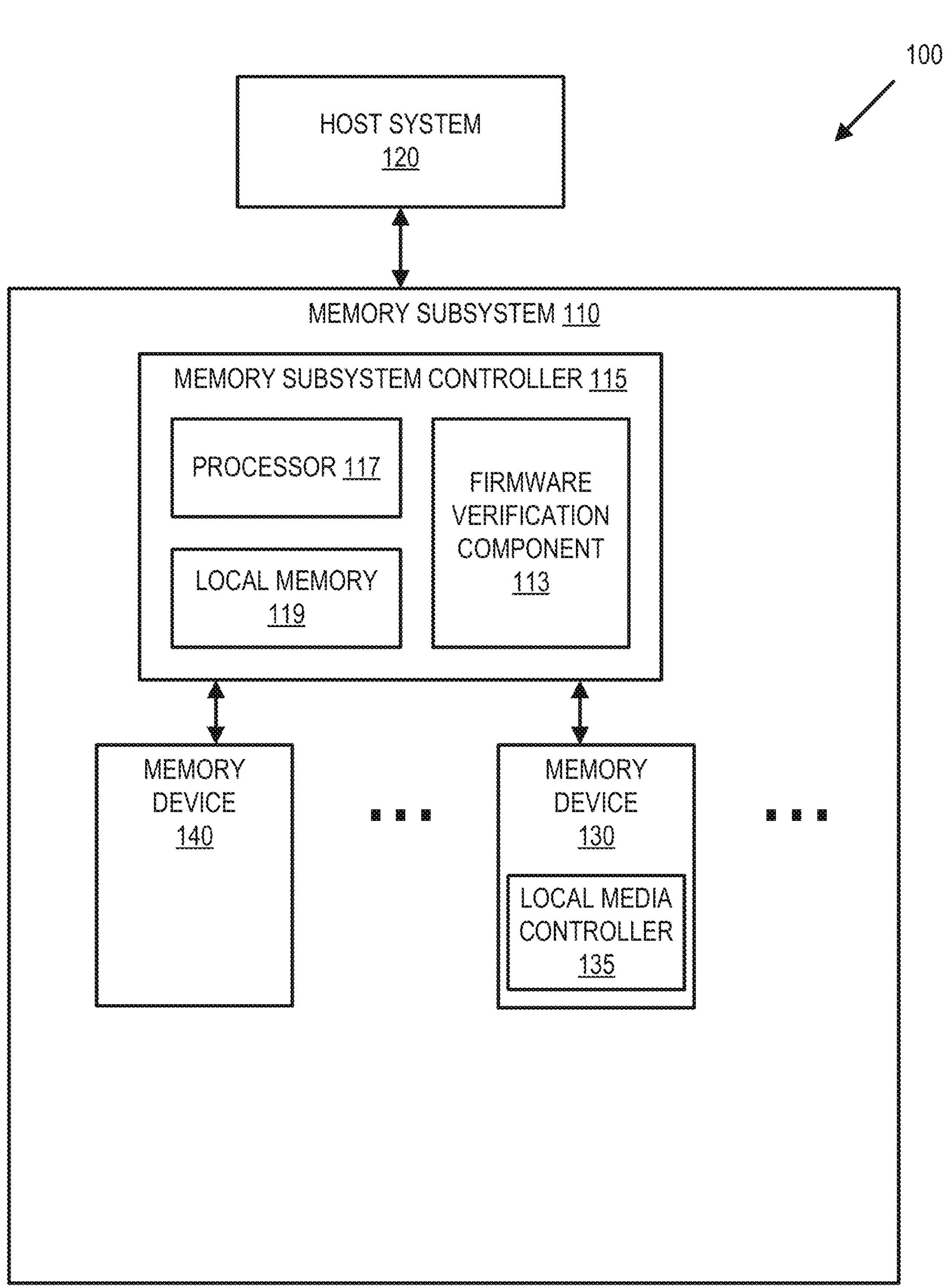
FIG. 1 illustrates an example computing system that includes a memory subsystem in accordance with some embodiments of the present disclosure.

Aspects of the present disclosure are directed to firmware verification using parity information in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as “0” and “1”, or combinations of such values. There are various types of cells, such as single-level cells (SLCs), multi-level cells (MLCs), triple-level cells (TLCs), and quad-level cells (QLCs). For example, an SLC can store one bit of information and has two logic states.

In conventional memory subsystems, a memory device performs verification of a firmware image, e.g., during power-up for a boot loader. In some systems, the memory device uses a cryptographic operation to verify the firmware image. For example, memory devices can use digital signatures, hash operations, and other cryptographic operations to generate a representation of the firmware image. Performing cryptographic operations for a firmware image can be a time-consuming process because firmware images can be very large and cryptographic processes tend to include complex algorithms. Accurate verification of a firmware image, however, provides security for the system. For example, firmware verification can identify malware installed during boot loading.

Aspects of the present disclosure address the above and other deficiencies by verifying the firmware image using firmware image parity information rather than the entire firmware image. For example, the firmware image includes parity information for the firmware data contained within the firmware image that is unique. Verifying the parity information therefore serves as an accurate verification of the associated firmware image. Parity information can also be substantially smaller than the firmware image itself (e.g., 512 bytes of parity data for each 4 kilobytes of firmware data), greatly reducing the time cost of performing cryptographic operations on the firmware image and, as a result, reducing power up time or the timing for similar events that include firmware image verification.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes firmware verification component 113 that can verify a firmware image using parity information. In some embodiments, the controller 115 includes at least a portion of the firmware verification component 113. For example, the controller 115 can include a processor 117 (processing device) configured to execute instructions stored in local memory 119 for performing the operations described herein. In some embodiments, firmware verification component 113 is part of the host system 120, an application, or an operating system.

The firmware verification component 113 can read a firmware image, compute parity data for a firmware image, receive a message authentication code, compute a message authentication code by performing a cryptographic operation on the parity data, and determine whether message authentication codes match. Further details with regards to the operations of the firmware verification component 113 are described below.

Figure 2:
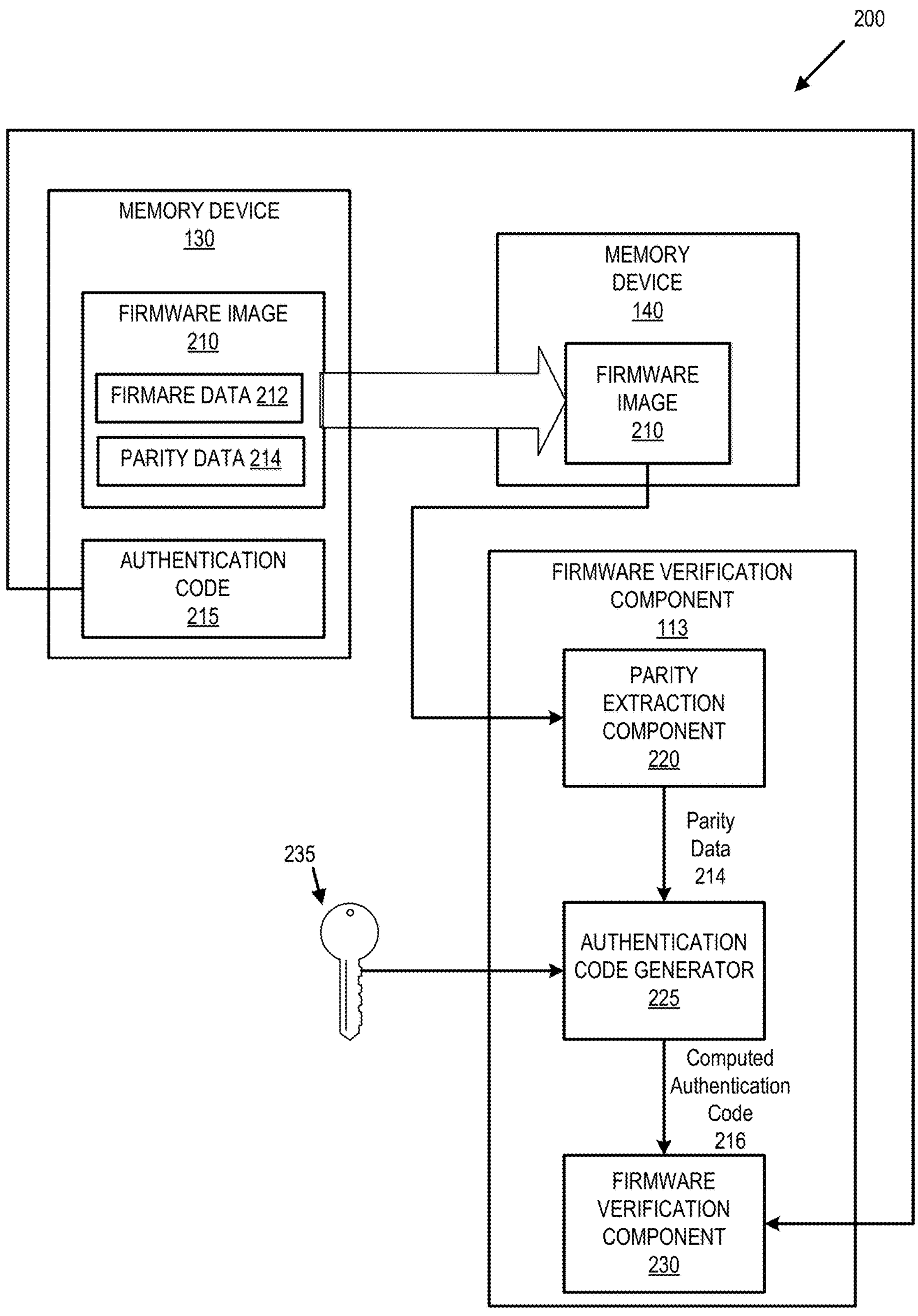
FIG. 2 illustrates another example computing system that includes a memory subsystem in accordance with some embodiments of the present disclosure.

FIG. 2 illustrates another example computing system 200 that includes a memory subsystem in accordance with some embodiments of the present disclosure. Example computing system 200 includes memory device 130, memory device 140, and firmware verification component 113. In one embodiment, memory device 130 is a non-volatile memory device and memory device 140 is a volatile memory device. For one example, memory device 130 is a NAND memory device and memory device 140 is a RAM device. Memory device 130 includes firmware image 210 containing firmware data 212 and parity data 214. Memory device 130 also includes authentication code 215. Firmware image 210 is a version of the firmware for a memory subsystem (e.g., memory subsystem 110 of FIG. 1) stored in a memory device. For example, firmware image 210 contains the operating system for the memory subsystem.

In some embodiments, computing system 200 receives firmware image 210 and stores firmware image 210 in memory device 130. For example, computing system 200 receives firmware image 210 from a host system (e.g., host system 120 of FIG. 1) and writes firmware image 210 to memory device 130. In some embodiments, computing system 200 performs a verification operation before writing firmware image 210 into memory device 130. For example, although described as a verification operation for reading firmware image 210 from memory device 130, the following operations of firmware verification component 113 can also be performed on firmware image 210 received from host system 120 to verify the authenticity and security of firmware image 210 before writing firmware image 210 to memory device 130.

In some embodiments, computing system 200 reads firmware image 210 from memory device 130 including firmware data 212 and parity data 214. In some embodiments, computing system 200 writes firmware image 210 into memory device 140. In some embodiments, authentication code 215 is also written to memory device 140. Firmware data 212 is the data for the firmware image, e.g., the data for the firmware to be executed by memory subsystem 110 for operation of memory subsystem 110. Parity data 214 is the parity information for firmware data 212. For example, parity data 214 is the low-density parity check (LDPC) code associated with firmware data 212. In some embodiments, firmware verification component 113 calculates parity data 214 for firmware data 212. For example, firmware verification component 113 uses an LDPC algorithm to generate an LDPC code for firmware data 212.

Firmware verification component 113 aggregates parity data 214 of firmware image 210. For example, parity extraction component 220 reads firmware image 210 from RAM (e.g., memory device 140), extracts parity data for each portion of firmware image 210 and aggregates the parity data from each portion to get parity data 214. In some embodiments, parity extraction component 220 extracts parity data 214 from firmware image 210 stored in memory device 130 and stores parity data 214 in memory device 140 rather than storing the entirety of firmware image 210 in memory device 140. Parity extraction component 220 sends parity data 214 to authentication code generator 225.

In some embodiments, firmware image 210 includes multiple portions, such as pages. In such embodiments, firmware verification component 113 can read a portion of the entire firmware image 210 and extract the parity data for that portion. For example, firmware verification component 113 executes a read command on a page of firmware image 210 and extracts the parity data for that page of firmware image 210 as indicated by the LDPC code, e.g., based on a number of bits having the same value (such as bits having a value of "1"), by applying an exclusive-or (XOR) operation to a combination of bits, using a Low-Density Parity Check (LDPC) algorithm, etc.

Authentication code generator 225 receives parity data 214 from parity extraction component 220. In some embodiments, authentication code generator 225 also receives key 235. For example, authentication code generator 225 retrieves a private key from dedicated registers of memory subsystem 110 (e.g., registers of local memory 119). In some embodiments, authentication code generator 225 receives a public key.

Authentication code generator 225 performs a cryptographic operation on parity data 214 to generate computed authentication code 216. For example, authentication code generator 225 performs a SHA-256 operation on parity data 214 to generate computed authentication code 216. The term cryptographic operation as used herein includes encryption operations, hash operations, and any operation used for transforming data for the purposes of generating hash tables, performing integrity verification, performing handshake authentication, generating digital signatures, and similar operations.

In some embodiments, authentication code generator 225 performs a hash operation on parity data 214 using key 235. For example, authentication code generator 225 performs a cryptographic hash operation on parity data 214 using key 235 to generate computed authentication code 216. Performing a cryptographic hash operation on a large amount of data (e.g., firmware image 210) is a very time-consuming operation. By performing the cryptographic hash operation only on a smaller amount of data (e.g., parity data 214 as compared to firmware image 210), computing system 200 computes computed authentication code 216 significantly faster.

In some embodiments, authentication code generator 225 computes a hash-based message authentication code (HMAC) using key 235. For example, authentication code generator 225 uses the following equation:

$$HMAC = Hash([Hash(Key) XOR\ OuterPadding] \parallel Hash([Hash(Key)\ XOR\ InnerPadding] \parallel ParityData))$$

where HMAC is computed authentication code 216, Key is key 235, ParityData is parity data 214, Hash( ) is a hash operation, XOR is an exclusive-or operation, || is a concatenation operation, and InnerPadding and OuterPadding are padding bits used to ensure security against length extension attacks. In one embodiment, Hash( ) is a SHA-256 operation.

Authentication code generator 225 sends computed authentication code 216 to firmware verification component 230. Firmware verification component 230 receives computed authentication code 216 from authentication code generator 225 and reads or otherwise receives authentication code 215 from memory device 130. In some embodiments, firmware verification component 230 receives authentication code 215 from memory device 140. Firmware verification component 230 determines whether authentication code 215 and computed authentication code 216 match. Firmware verification component 230 verifies firmware image 210 if computed authentication code 216 and authentication code 215 match and rejects/does not verify firmware image 210 if computed authentication code 216 and authentication code 215 do not match.

In some embodiments, firmware verification component 113 is part of a bootloader system for memory subsystem 110 and is used to verify a current installation of firmware image 210. For example, in response to firmware verification component 230 verifying that computed authentication code 216 and authentication code 215 match, firmware verification component 113 loads/installs firmware image 210 into memory subsystem 110 and/or otherwise allows the boot up of memory subsystem 110 with firmware image 210. In response to firmware verification component 230 failing to verify that computed authentication code 216 and authentication code 215 match, firmware verification component 113 tries to find another firmware image on memory device 130. In some embodiments, where firmware verification component 113 does not find another firmware image, firmware verification component 113 enters memory subsystem 110 into an error mode. For example, firmware verification component 113 causes memory subsystem 110 to send host system 120 an indication that firmware verification failed.

Figure 3:
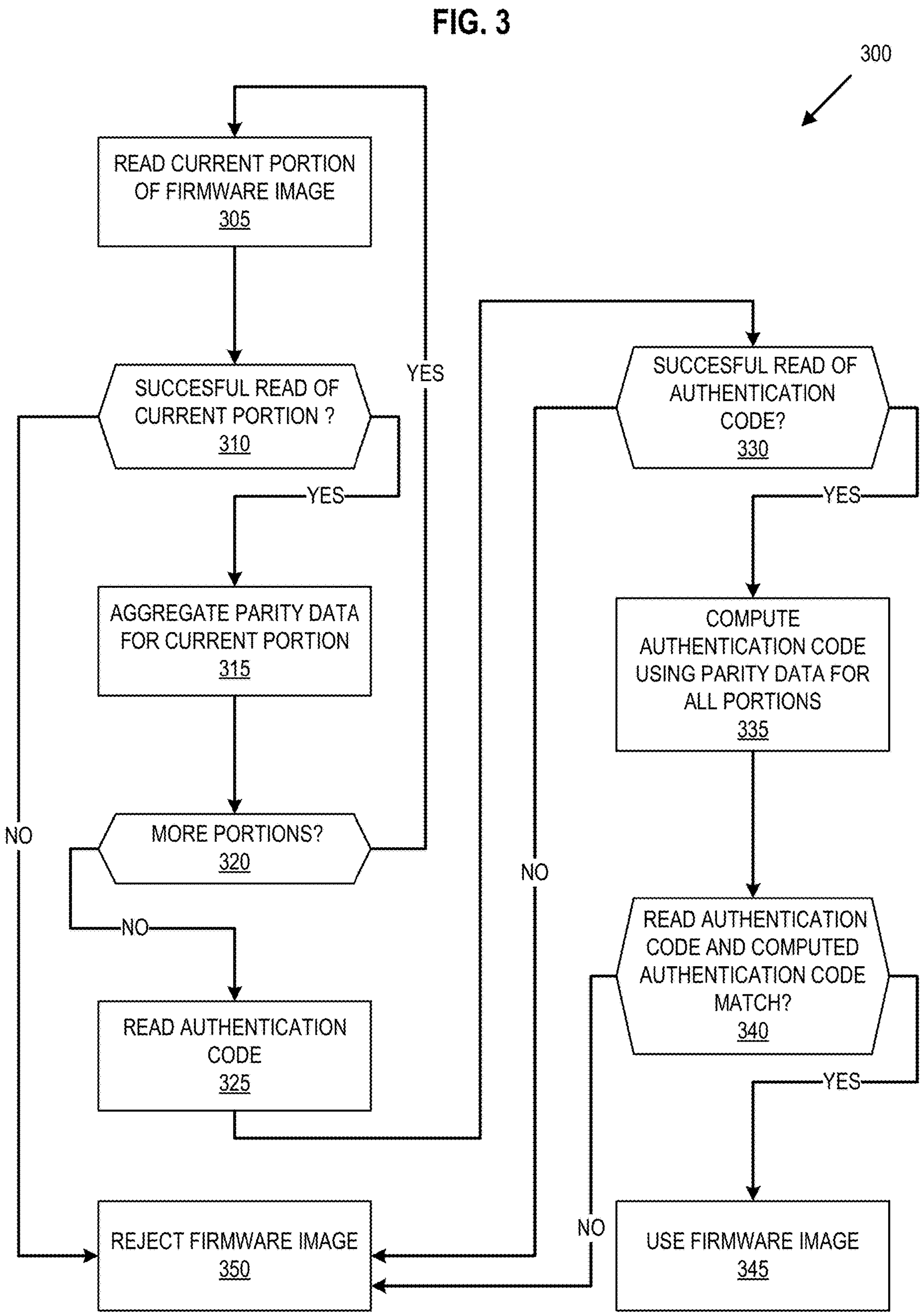
FIG. 3 is a flow diagram of an example method to verify firmware using parity information in accordance with some embodiments of the present disclosure.

FIG. 3 is a flow diagram of an example method 300 to verify firmware using parity information in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by the firmware verification component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device reads the current page of the firmware image. For example, firmware verification component 113 executes a read command to read a current page of a firmware image (e.g., firmware image 210 of FIG. 2) from a memory device (e.g., memory device 130 and/or 140 of FIGS. 1 and 2). In some embodiments, the read command is received from a memory subsystem (e.g., memory subsystem 110 of FIG. 1) as part of a firmware verification process. For example, upon power up, the memory subsystem sends a read command to firmware verification component 113 to verify the firmware image.

At operation 310, the processing device determines whether the read of the current portion was successful. For example, firmware verification component 113 decodes the current page using an LDPC algorithm to determine whether there are any errors in the current portion of the firmware image. In some embodiments where errors are detected, the processing device corrects the current portion of the firmware image by comparing the received parity bits to the bits generated by decoding the current page using the LDPC decoding algorithm. For example, the processing device corrects the current page such that it matches the received parity bits. In some embodiments, the processing device corrects the whole firmware image and/or the parity data. For example, firmware verification component 113 corrects firmware data 212 and/or parity data 214. If the processing device is unable to correct the discrepancy, the processing device determines that the current page includes an uncorrectable error correction code (UECC) and that the read of the current portion of the firmware image was not successful. In such situations, method 300 proceeds to operation 350. If the processing device determines that the read of the current portion was successful, method 300 proceeds to operation 315.

At operation 315, the processing device aggregates the parity data for the current portion. For example, firmware verification component 113 extracts the parity data from the current page of the firmware image and aggregates it with the parity data for the previous pages of the firmware image. In some embodiments, firmware verification component 113 aggregates the parity data by storing the parity data for the current portion in a buffer.

At operation 320, the processing device determines whether there are more portions of the firmware image. For example, firmware verification component 113 determines whether it has read the entirety of the firmware image. If the processing device determines that there are more portions of the firmware image, method 300 proceeds to operation 305 to process the next portion. If the processing device determines that there are no more portions of the firmware image, method 300 proceeds to operation 325.

At operation 325, the processing device reads the message authentication code. For example, firmware verification component 113 reads authentication code 215 from memory device 130.

At operation 330, the processing device determines whether the read of the message authentication code was successful. For example, firmware verification component 113 decodes the message authentication code using an LDPC algorithm to determine whether there are any errors in the message authentication code. In some embodiments where errors are detected, the processing device corrects the message authentication code by comparing the received parity bits to the bits generated by decoding the message authentication code using the LDPC decoding algorithm. For example, the processing device corrects the message authentication code such that it matches the received parity bits. If the processing device is unable to correct the discrepancy, the processing device determines that the message authentication code includes an uncorrectable error correction code (UECC) and that the read of the message authentication code was not successful. In such situations, method 300 proceeds to operation 350. If the processing device determines that the read of the message authentication code was successful, method 300 proceeds to operation 335.

At operation 335, the processing device computes a message authentication code using parity data for all the portions. For example, firmware verification component 113 performs an HMAC operation on the aggregated parity data 214 for all portions of the firmware image to generate a computed authentication code. The processing device saves time computing the message authentication code by performing the HMAC operation on the parity data for the firmware image but not the firmware image itself. In some embodiments, the processing device computes the message authentication code using a cryptographic key. For example, firmware verification component 113 uses key 235 to compute message authentication code. In some embodiments, the key is a private key stored in registers accessible to firmware verification component 113. For example, the key is stored in local memory 119 of FIG. 1. In some embodiments, the processing device performs an HMAC-SHA256 operation on the parity data to generate the computed message authentication code.

At operation 340, the processing device determines whether the read message authentication code and the computed message authentication code match. For example, firmware verification component 113 compares the message authentication code read and/or received in operation 325 to the message authentication code computed in operation 335. If the message authentication codes match, method 300 proceeds to operation 345. If the message authentication codes do not match, method 300 proceeds to operation 350.

At operation 345, the processing device uses the firmware image. For example, memory subsystem 110 loads the verified firmware image and boots using the verified firmware image.

At operation 350, the processing device rejects the firmware image. For example, memory subsystem 110 attempts to boot using a different firmware image. In some embodiments, the processing device restarts and tries to verify the firmware image again.

Figure 4:
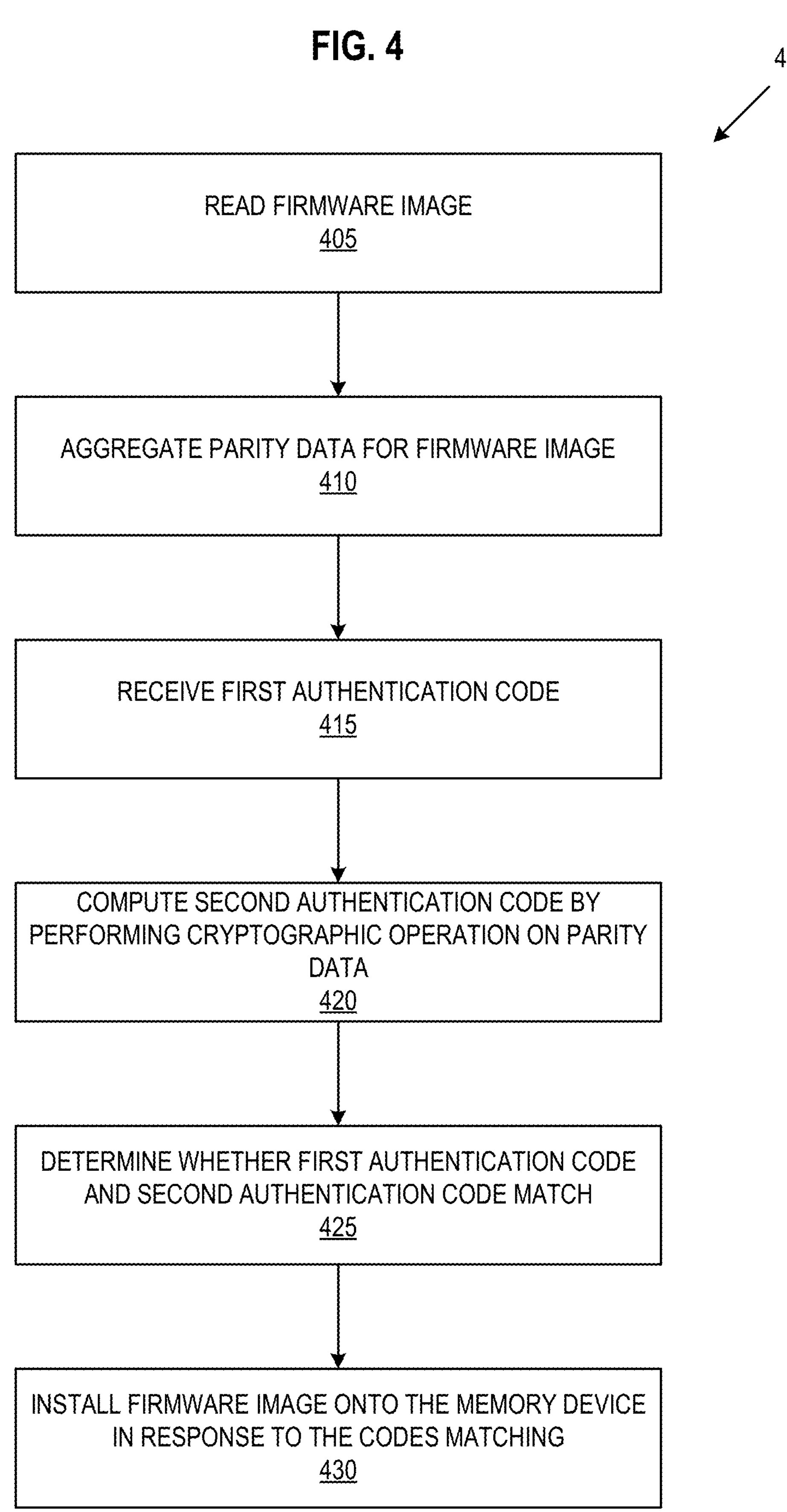
FIG. 4 is a flow diagram of an example method to verify firmware using parity information in accordance with some embodiments of the present disclosure.

FIG. 4 is a flow diagram of an example method 400 to verify firmware using parity information, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by the firmware verification component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device reads the firmware image. For example, firmware verification component 113 executes a read command to read the firmware image (e.g., firmware image 210 of FIG. 2) from a memory device (e.g., memory device 130 and/or 140 of FIGS. 1 and 2). In some embodiments, the read command is received from a memory subsystem (e.g., memory subsystem 110 of FIG. 1) as part of a firmware verification process. For example, upon power up, the memory subsystem sends a read command to firmware verification component 113 to verify the firmware image. In some embodiments, the processing device reads the firmware image by executing multiple read commands. For example, the processing device reads the firmware image page by page.

At operation 410, the processing device aggregates parity data for the firmware image. For example, firmware verification component 113 aggregates the LDPC data for the firmware image. In some embodiments, the processing device aggregates the parity data for the firmware image portion by portion. For example, as the processing device executes multiple read commands, the processing device aggregates the parity data for the current executed read command along with the parity data for all previous read commands for the firmware image.

At operation 415, the processing device receives a first message authentication code. For example, firmware verification component 113 reads a stored copy of a message authentication code (e.g., authentication code 215) for the firmware.

At operation 420, the processing device computes a second message authentication code by performing a cryptographic operation on the aggregated parity data. For example, firmware verification component 113 performs an HMAC operation on the parity data of the firmware image to generate a computed authentication code. The processing device saves time computing the message authentication code by performing the HMAC operation on the parity data for the firmware image but not the firmware image itself. In some embodiments, the processing device computes the message authentication code using a cryptographic key. For example, firmware verification component 113 uses key 235 to compute the message authentication code. In some embodiments, the key is a private key stored in registers accessible to firmware verification component 113. For example, the key is stored in local memory 119 of FIG. 1. In some embodiments, the processing device performs an HMAC-256 operation on the parity data to generate the computed message authentication code.

At operation 425, the processing device determines whether the first message authentication code and the second message authentication code match. For example, firmware verification component 113 compares the message authentication code received in operation 415 to the message authentication code computed in operation 425 and determines that they match if they are the same.

At operation 430, the processing device loads the firmware image onto the memory device in response to the codes matching. For example, memory subsystem 110 loads the verified firmware image during boot up. In some embodiments, the processing device boots using the verified firmware image.

Figure 5:
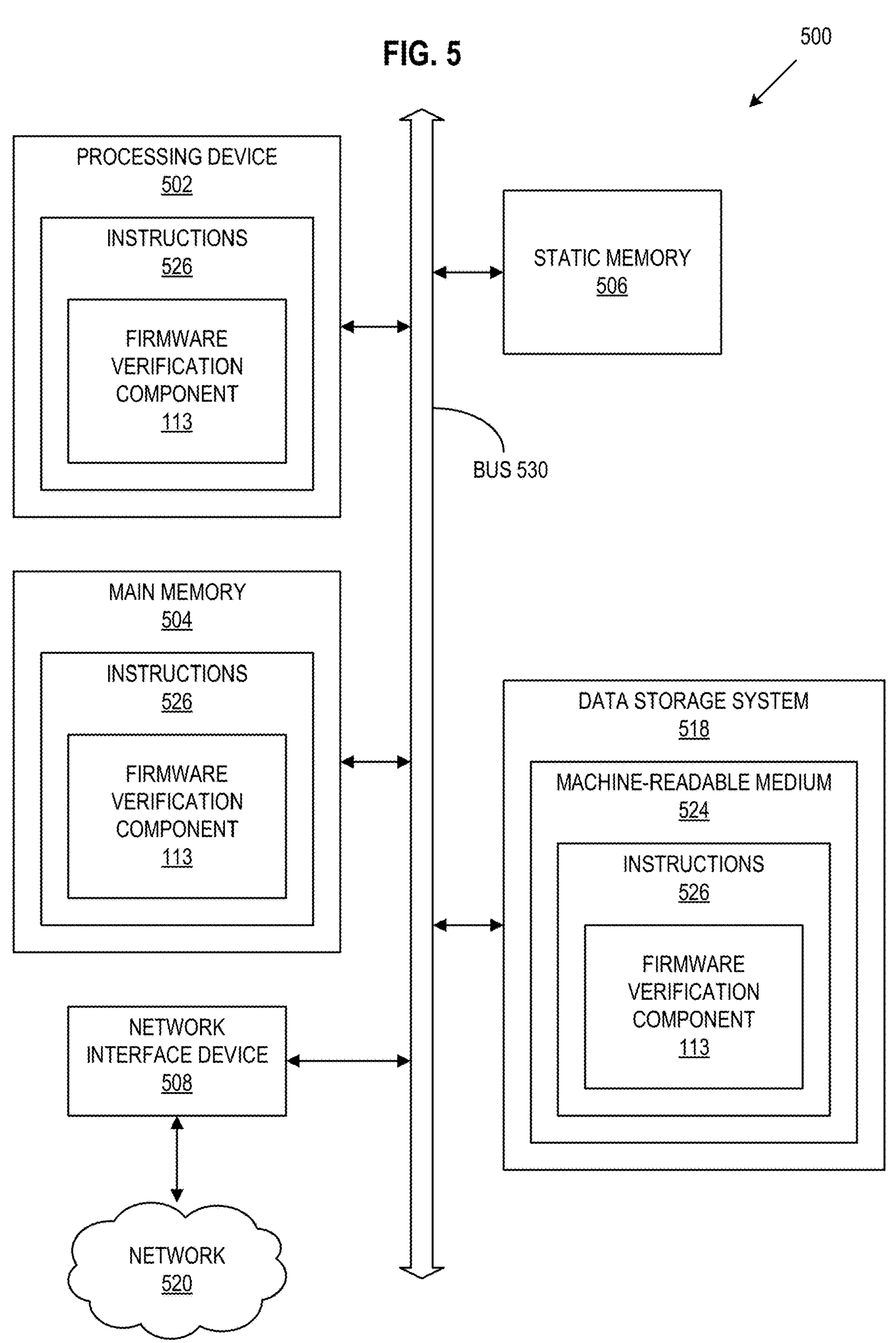
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the firmware verification component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a firmware verification component (e.g., the firmware verification component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

reading a firmware image from a memory device;

aggregating parity data for the firmware image;

receiving a first authentication code associated with the firmware image;

computing a second authentication code as a result of performing a cryptographic operation on the parity data;

determining the first authentication code and the second authentication code match; and loading the firmware image onto the memory device in response to determining that the first authentication code and the second authentication code match.

2. The method of claim 1, wherein performing the cryptographic operation on the parity data comprises:

performing a hash operation on the parity data.

3. The method of claim 2, wherein performing the hash operation on the parity data uses a cryptographic key.

4. The method of claim 1, wherein detecting an uncorrectable error in the firmware image triggers a rejection of the firmware image.

5. The method of claim 1, wherein detecting an uncorrectable error in the first authentication code triggers a rejection of the firmware image.

6. The method of claim 1, wherein the firmware image comprises a plurality of portions, wherein reading the firmware image from the memory device comprises reading the plurality of portions, and wherein computing the parity data of the firmware image comprising computing a parity data portion for a portion of the plurality of portions.

7. The method of claim 1, wherein the parity data is a low-density parity check code and wherein computing the parity data comprises reading the low-density parity check code from the memory device.

8. A non-transitory computer-readable storage medium comprising instructions that, when executed by a processing device, cause the processing device to:

read a firmware image from a memory device;

aggregate parity data for the firmware image;

receive a first authentication code associated with the firmware image;

compute a second authentication code as a result of performing a cryptographic operation on the parity data;

determine the first authentication code and the second authentication code match; and load the firmware image onto the memory device in response to determining that the first authentication code and the second authentication code match.

9. The non-transitory computer-readable storage medium of claim 8, wherein performing the cryptographic operation on the parity data comprises:

performing a hash operation on the parity data.

10. The non-transitory computer-readable storage medium of claim 9, wherein performing the hash operation on the parity data uses a cryptographic key.

11. The non-transitory computer-readable storage medium of claim 8, wherein detecting an uncorrectable error in the firmware image triggers a rejection of the firmware image.

12. The non-transitory computer-readable storage medium of claim 8, wherein detecting an uncorrectable error in the first authentication code triggers a rejection of the firmware image.

13. The non-transitory computer-readable storage medium of claim 8, wherein the firmware image comprises a plurality of portions, wherein reading the firmware image from the memory device comprises reading the plurality of portions, and wherein computing the parity data of the firmware image comprising computing a parity data portion for a portion of the plurality of portions.

14. The non-transitory computer-readable storage medium of claim 8, wherein the parity data is a low-density parity check code and wherein computing the parity data comprises reading the low-density parity check code from the memory device.

15. A system comprising:

a plurality of memory devices; and a processing device, operatively coupled with the plurality of memory devices, to:

read a firmware image from a memory device;

aggregate parity data for the firmware image;

receive a first authentication code associated with the firmware image;

compute a second authentication code as a result of performing a cryptographic hash operation on the parity data;

determine the first authentication code and the second authentication code match; and load the firmware image onto the memory device in response to determining that the first authentication code and the second authentication code match.

16. The system of claim 15, wherein performing the cryptographic hash operation on the parity data uses a cryptographic key.

17. The system of claim 15, wherein detecting an uncorrectable error in the firmware image triggers a rejection of the firmware image.

18. The system of claim 15, wherein detecting an uncorrectable error in the first authentication code triggers a rejection of the firmware image.

19. The system of claim 15, wherein the firmware image comprises a plurality of portions, wherein reading the firmware image from the memory device comprises reading the plurality of portions, and wherein computing the parity data of the firmware image comprising computing a parity data portion for a portion of the plurality of portions.

20. The system of claim 15, wherein the parity data is a low-density parity check code and wherein computing the parity data comprises reading the low-density parity check code from the memory device.

* * * * *